United States Patent
Feist

(10) Patent No.: US 9,679,599 B1
(45) Date of Patent: Jun. 13, 2017

(54) ADAPTIVE FIELD ADJUSTMENT OF TRANSDUCER POWER LEVELS

(71) Applicant: Seagate Technology LLC, Cupertino, CA (US)

(72) Inventor: Jason M. Feist, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/248,693

(22) Filed: Aug. 26, 2016

(51) Int. Cl.
*G11B 27/36* (2006.01)
*G11B 21/02* (2006.01)
*G11B 7/1263* (2012.01)
*G11B 20/18* (2006.01)
*G11B 5/127* (2006.01)
*G11B 5/17* (2006.01)
*G11B 5/39* (2006.01)
*G11B 5/00* (2006.01)

(52) U.S. Cl.
CPC .......... *G11B 7/1263* (2013.01); *G11B 5/1278* (2013.01); *G11B 5/17* (2013.01); *G11B 5/3903* (2013.01); *G11B 20/18* (2013.01); *G11B 2005/0021* (2013.01)

(58) Field of Classification Search
CPC ..... G11B 5/4907; G11B 25/043; G11B 33/08; G11B 5/59627; G11B 5/54; G11B 27/36; G11B 5/012; G11B 2220/20; G11B 20/18; G11B 2005/0021; G11B 5/314; G11B 5/6005; G11B 5/59633
USPC ......... 360/31, 53, 59, 75, 77.04, 97.12, 328, 360/125.31; 369/13.13, 13.33, 13.26
See application file for complete search history.

(56) References Cited

U.S. PATENT DOCUMENTS

| | | |
|---|---|---|
| 5,341,359 A | 8/1994 | Birukawa et al. |
| 5,828,583 A | 10/1998 | Bush et al. |
| 6,557,126 B1 | 4/2003 | Kelly |
| 6,920,097 B2 | 7/2005 | Kim |
| 7,336,434 B2 | 2/2008 | Lille et al. |
| 8,391,107 B2 | 3/2013 | Gage et al. |
| 8,824,249 B2 * | 9/2014 | Erden ............. G11B 5/02 369/13.26 |
| 8,842,507 B1 | 9/2014 | Hirano et al. |
| 8,854,929 B1 | 10/2014 | Champion et al. |
| 8,897,103 B2 | 11/2014 | Alex |
| 9,236,081 B1 | 1/2016 | Chu et al. |

* cited by examiner

*Primary Examiner* — Nabil Hindi
(74) *Attorney, Agent, or Firm* — Hall Estill Attorneys at Law

(57) ABSTRACT

Method and apparatus adaptively adjusting power levels of a data transducer in a data storage device. In some embodiments, an initial power value is applied to a powered element of a transducer to write user data from a host device to a rotatable data recording medium. An exception condition is declared responsive to a measured parameter. The transducer is used to read data from an evaluation track using a range of different input power values for the powered element. A different, new power value is selected for the powered element responsive to an error rate associated with each of the range of different input power values, with the new power value being lower than the initial power value. Thereafter, the new power value is applied to the powered element during a subsequent writing of user data to the rotatable data recording medium.

20 Claims, 6 Drawing Sheets

ADAPTIVE FIELD ADJUSTMENT OF TRANSDUCER POWER LEVELS

SUMMARY

Various embodiments of the present invention are generally directed to adaptively adjusting power levels of a data read/write transducer in a data storage device during end user (field) operation of the device.

In accordance with some embodiments, an initial power value is applied to a powered element of a transducer to write user data from a host device to a rotatable data recording medium. An exception condition is declared responsive to a measured parameter. The transducer is used to read data from an evaluation track using a range of different input power values for the powered element. A different, new power value is selected for the powered element responsive to an error rate associated with each of the range of different input power values, with the new power value being lower than the initial power value. Thereafter, the new power value is applied to the powered element during a subsequent writing of user data to the rotatable data recording medium In related embodiments, a data storage device has a data transducer adjacent a rotatable data recording medium. A transducer control circuit is configured to apply an initial power value to a powered element of the transducer to write user data from a host device to the rotatable data recording medium. A reliability monitoring circuit is configured to declare an exception condition responsive to a measured parameter associated with the transducer. A scheduler circuit is configured to direct the transducer to read data from an evaluation track on the rotatable data recording medium using a range of different input power values for the powered element. A parametric adjustment circuit is configured to select a different, new power value for the powered element responsive to an error rate associated with each of the range of different input power values. The new power value is lower than the initial power value, and the transducer control circuit applies the new power value to the powered element during a subsequent writing of user data to the rotatable data recording medium.

These and other features and advantages which characterize the various embodiments of the present disclosure can be understood in view of the following detailed discussion and the accompanying drawings.

DETAILED DESCRIPTION

Figure 1:
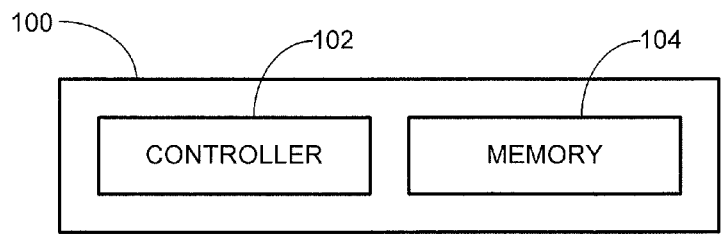
FIG. 1 is a functional block representation of a data storage device constructed and operated in accordance with various embodiments of the present disclosure.

The present disclosure is generally directed to data storage systems, and more particularly to devices and methods for controlling the operation of a data transducer adjacent a rotatable data recording medium.

Some data storage devices such as hard disc drives (HDDs) store data on one or more rotatable magnetic recording media (discs). The discs are accessed by a corresponding array of data read/write transducers (heads). The transducers are supported adjacent the disc surfaces by fluidic currents established by high speed rotation of the discs. Current generation transducers may be flown at fly heights in the range of tens of Angstroms (e.g., $10^{-9}$ m) and it is expected that fly heights will continue to decrease in the future.

HDDs often define concentric tracks on the various disc recording surfaces. Data may be written to the tracks using a magnetic write element with a coil that generates magnetic write fields which establish sequential magnetization patterns in a recording layer of the associated surface. Data are read from the tracks using one or more read sensors that sense the previously written magnetization patterns.

Besides the write and read elements, transducers can include a number of additional operative elements. A slider body can be provided with an air bearing surface (ABS) designed to maintain the transducer in a stable flying relation above the medium during read and write operations. A fly height adjustment (FHA) mechanism can be used to adjust the fly height through heating and thermal expansion of the slider body, thereby bringing the write and read elements closer to the media surface. Proximity and/or contact sensors can be used to detect physical contact between the transducer and the medium. Other elements can be incorporated into the transducer as well.

Various strategies have been employed to enhance areal density of the recorded data on a magnetic recording disc. One such strategy is sometimes referred to as thermally assisted recording, such as heat assisted magnetic recording (HAMR). In a HAMR system, an energy source such as a laser diode is affixed adjacent the write element. Electromagnetic energy from the laser diode is focused and transmitted through a wave guide and/or a near field transducer onto the medium. The transmitted energy temporarily increases the localized temperature of the medium. By raising the localized temperature of the medium to a level that approaches or exceeds the Curie temperature, the magnetic coercivity of the magnetic material of the recording layer can be significantly reduced, allowing the layer to be written (magnetized) by the write element. Once written, the medium cools to an ambient temperature and the native coercivity of the magnetic material allows the written magnetized pattern to be maintained in a highly stable condition.

While operable, one drawback to the use of HAMR and other thermally assisted recording techniques is that the energy used to locally heat the medium can also tend to heat the transducer as well. This can cause undesired head protrusion as the slider body or other aspects of the transducer thermally expand and bring the write and read elements closer to the medium. This phenomenon is referred to herein as "writer protrusion" or "laser induced head protrusion." Writer protrusion brings the write element closer than intended to the corresponding media surface. In some cases, writer protrusion may result in undesired contact of the transducer with the media surface, which may damage the head/disc interface and can be detrimental to the reliability of the HAMR system.

Another drawback to the heating of the transducer is that the elevated temperatures induced by the operation of the HAMR diode (or other operative elements such as the fly height adjustment heater) can adversely affect the performance and reliability of the transducer. For example, elevated temperatures can introduce thermal noise in the readback signals obtained from the readback sensors, increasing the observance of errors (e.g., elevated bit error rates, BER). Elevated temperatures can also significantly shorten the operational life of the diodes, near field transistors (NFTs), sensors and other elements of the transducers.

Accordingly, various embodiments of the present disclosure are generally directed to a method and apparatus for adjusting power levels used by various operative elements of a data transducer to enhance system performance and reliability.

As explained below, some embodiments generally involve applying an initial power value to a powered element of a hydrodynamically supported transducer to write user data from a host device to a rotatable data recording medium. The power value can take a variety of forms including a laser diode power setting for a HAMR diode, a heater value used in fly height adjustments, a write current magnitude used by a write element, etc.

One or more parametric measurements, such as temperature, bit error rate (BER), estimated fly heights, etc. are obtained during the use of the initial power value and supplied to a reliability analysis and monitoring circuit. The reliability analysis and monitoring circuit may form a portion of a SMART (system monitoring and reliability tracking) system of the data storage device, or some other analysis circuitry configured to monitor the health and performance of the device.

At such time that the reliability analysis and monitoring circuit indicates that a potential failure condition is imminent due to observed or expected degradation of performance, a cycle test is scheduled and executed. The cycle test is performed during ongoing servicing of existing access commands from the host device, and generally involves reading one or more specially configured test tracks at different power levels.

BER measurements are calculated for groupings of the data sectors from the test track read using the individual power levels, and the measurements are subjected to a curve fit operation to select a new, improved power level less than the existing level. The new power level is implemented and continued monitoring is carried out to determine if the imminent failure condition continues to be flagged by the monitoring circuit. If so, the above cycle testing is again performed to iterate a new power level setting. It is contemplated that the cycle testing can be achieved in a relatively short period of time, such as less than 50 milliseconds, ms, allowing the cycle test to be scheduled as a normal command in an existing host access command queue and not impacting the existing data transfer rate performance of the device.

In this way, the system adaptively iterates new, lower power settings that can still provide the required levels of BER and other performance in response to elevated temperature or other situations of high stress or degraded performance. Real world operational results from host data transfers are used to judge the effectiveness of the newly enacted power settings. This can enhance system reliability while ensuring acceptable levels of performance are maintained by the device during ongoing operation, and eliminates the need to take the system offline to perform a power calibration operation.

These and other features and advantages of various embodiments can be understood beginning with a review of FIG. 1 which provides a generalized functional block diagram of a data storage device 100. The device 100 includes a controller 102 and a memory module 104. The controller 102 constitutes a top level controller circuit that carries out overall communication and control functions with a host device (not separately shown).

The controller circuit may be a hardware based processor or a programmable processor that utilizes programming code (e.g., firmware, etc.) stored in a local memory device. The memory module 104 stores data supplied by the host device and retrieves the data as required and may include one or more forms of non-volatile memory and associated data transfer and control circuitry to enable data transfers between the host device and the non-volatile memory.

It is contemplated that the memory module will include one or more rotatable magnetic recording media (discs) configured to store and retrieve data using a corresponding array of moveable data transducers. Other forms of memory may be used as well, including flash memory. The host device can take any number of suitable computer based devices including laptop or desktop computers, workstations, servers, handheld portable electronic devices, smart phones, tablets, game consoles, etc.

Figure 2:
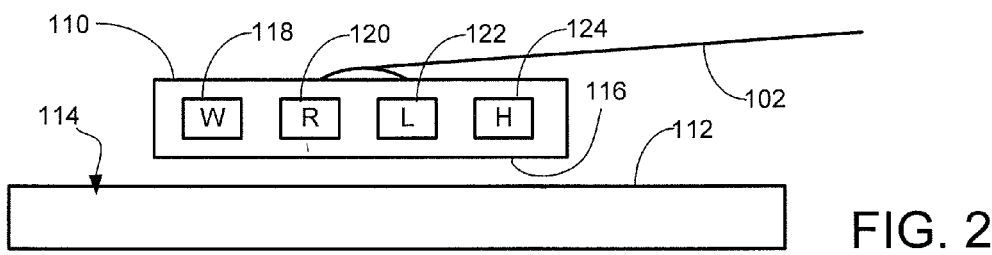
FIG. 2 shows aspects of a data read/write transducer of the data storage device of FIG. 1 in accordance with some embodiments.

FIG. 2 shows a selected data transducer 110 of the data storage device 100 of FIG. 1 in accordance with some embodiments. The data transducer 110 is hydrodynamically supported at a selected fly height adjacent a recording surface 112 of a rotatable magnetic recording disc 114 using an air bearing surface 116 of the transducer.

The body of the data transducer 110 supports a number of operative elements to effect data transfers with the disc 114. These are shown to include a data write element (W) 118, a data read sensor (R) 120, a laser diode (L) 122 and a heater (H) 124. Other configurations can readily be used, including configurations that utilize multiple sets of such elements (e.g., multiple read sensors, etc.), configurations that use additional elements (e.g., proximity or contact sensors, etc.) and configurations that omit one or more of these respective elements.

To provide a concrete illustration, the write element 118 is a perpendicular magnetic recording element with a write coil adapted to write data to a recording layer of the disc 114 as a time varying pattern or sequence of magnetic reversals (transitions). The read sensor 120 is a magneto-resistive (MR) sensor adapted to sense the magnetic transitions formed by the write element and generate a readback signal that, with the application of sophisticated signal processing, can enable the decoding of the originally written data.

The laser diode 122 forms a portion of a heat assisted magnetic recording (HAMR) system in which the media 114 is locally heated during a write operation to temporarily lower the magnetic coercivity of the recording layer of the media during a write operation. The HAMR system may include other elements as well such as one or more wave guides, a near field transistor (NFT), etc. to focus the electromagnetic radiation output by the laser diode.

The heater 124 forms a portion of a fly height adjustment (FHA) mechanism used to lower the fly height of the transducer to a selected fly height. This is carried out through thermal expansion of the transducer body, bringing the other operative elements (e.g., the writer, the reader, etc.) closer to the disc surface 112.

Figure 3:
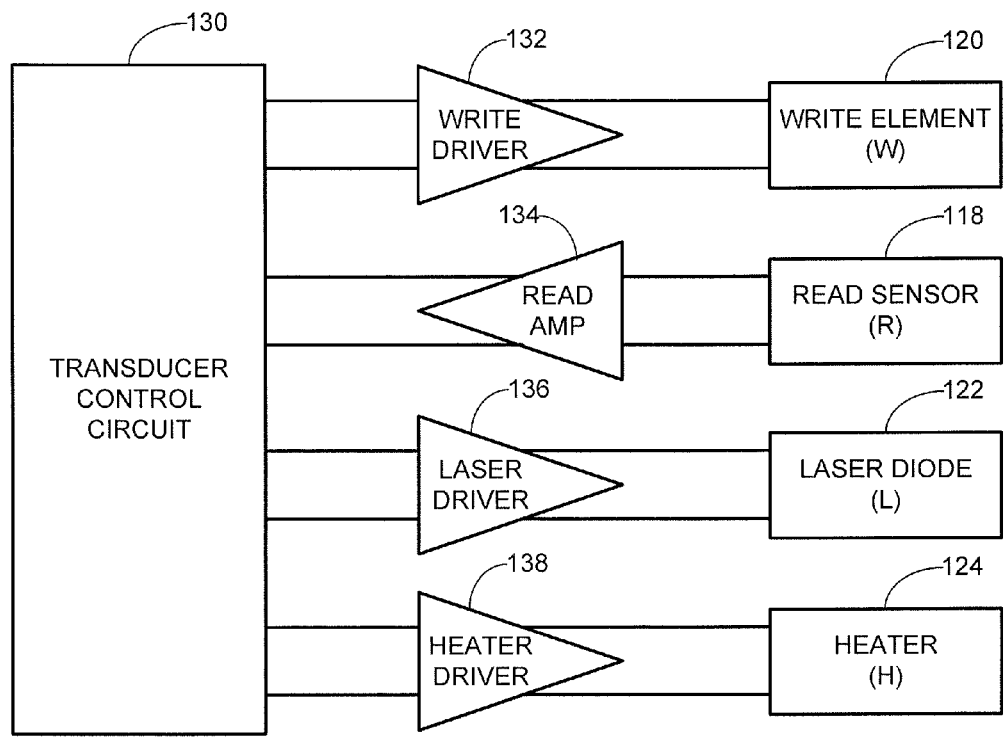
FIG. 3 shows control circuitry used to supply power to the various transducer elements of FIG. 2.

FIG. 3 shows a transducer control circuit 130 that may be used to provide driver signals and signal processing capabilities for the device 100. The transducer control circuit 130 may form a portion of a preamplifier/driver circuit (preamp) coupled to a rotary actuator that supports each of the data transducers 110 of FIG. 2. The transducer control circuit 130 provides power inputs in the form of differential write current input values to a write driver circuit 132 to drive bi-directional write currents through the write element 120 to effect the magnetic transitions in the recording layer to write user data thereto.

A read amplifier (amp) circuit 134 amplifies and conditions readback signals from the read sensor 118 during a read operation to detect the pattern previously written by the write element 120. While not shown, a low level read bias current may be passed through the read sensor 118 during such read operations, and pulses are generated at magnetic flux transitions.

The transducer control circuit 130 further provides power inputs in the form of laser power values to a laser driver circuit 136 to supply a forward biased voltage and/or current to the laser diode 122 to irradiate the media 114 during a write operation to locally heat and lower the coercivity of the recording layer during a write operation. A heater driver 138 receives input fly height adjustment power values from the transducer control circuit 130 to heat the resistive heater 124 to adjust the fly height (clearance distance) of the transducer 110 (see FIG. 2). Other power values may be supplied to the transducer 110 by the control circuit including rail voltages and other control signals that may affect the thermal temperature and performance of the transducer as required.

Figure 4:
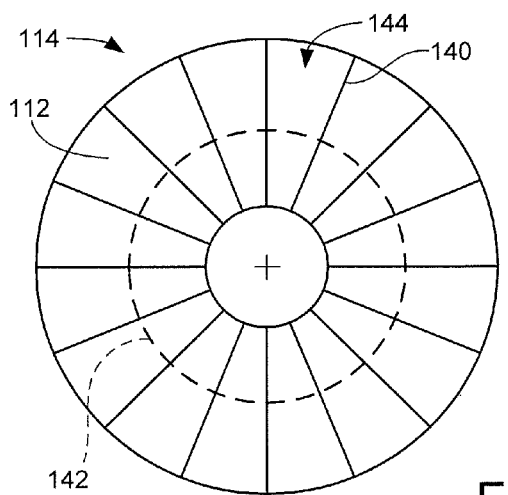
FIG. 4 shows a data recording surface of the device.

FIG. 4 is a schematic depiction of a selected one of the discs 114 of the data storage device. Recording surfaces such as 112 in FIG. 2 may be formed on opposing sides of the disc 114 and accessed by corresponding transducers 110. Any suitable number of discs 114 may be axially aligned and affixed for rotation at a constant velocity (such as 10,000 revolutions per minute, rpm) by a spindle motor (not shown) with a corresponding transducer provided for each media surface.

Each media recording surface 112 may include a number of servo data wedges 140 that extend radially across the media surfaces like spokes of a wheel. Each servo data wedge 140 comprises a number of adjacent servo fields that provide servo control data to enable positional control of the associated transducer 110 using a closed loop servo control system. The servo data can be used to define a number of concentric tracks 142, which nominally intersect the servo wedges at a given radius on the associated disc surface. The physical locations 144 along each track between adjacent servo wedges are used to define fixed sized data sectors used to store user data from a host device.

Figure 5:
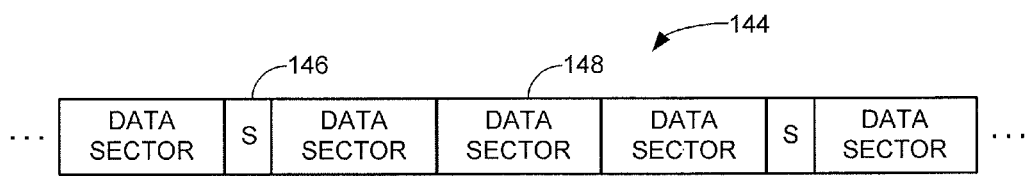
FIG. 5 illustrates an exemplary format for a data track on the surface of FIG. 4.

FIG. 5 is a simplified illustration of a portion of the exemplary track 142 from FIG. 4. Spaced apart servo (S) fields are denoted at 146, and a number of user data sectors 148 are defined in the spaces 144 between adjacent pairs of the servo fields. While only a few servo data wedges 142 are illustrated in FIG. 4, it will be understood that many tens or hundreds of servo fields 146 may be supplied to the disc, and many hundreds of data sectors 148 may be provided to each track 142.

Figure 6:
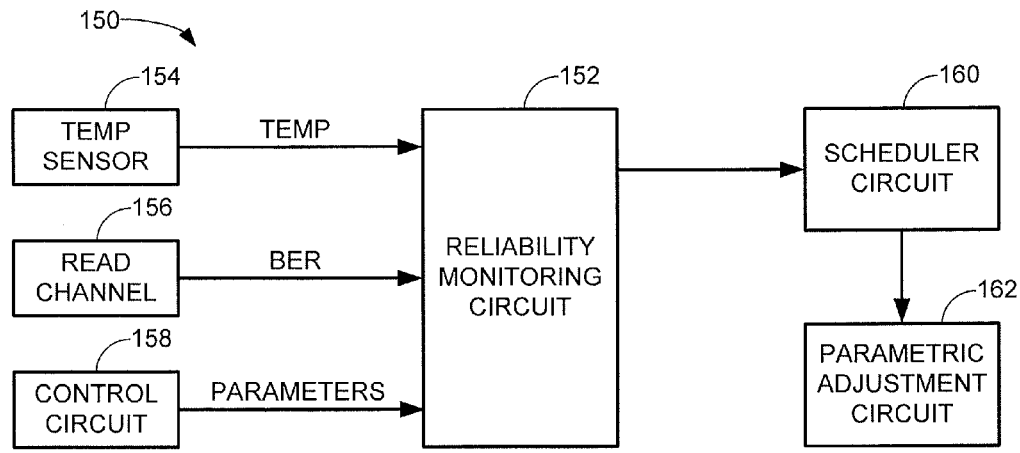
FIG. 6 shows control circuitry of the data storage device operative in accordance with some embodiments to enact power level adjustments during end user (field) use of the data storage device of FIG. 1.

FIG. 6 shows a reliability control circuit 150 constructed and operated in accordance with some embodiments. At least portions of the reliability control circuit 150 may be incorporated into the top level controller circuit 102 of FIG. 1. A reliability monitoring circuit 152 operates during normal data transfer operations of the device 100 to monitor performance of the device with various inputs from other aspects of the system. Exemplary inputs may include temperature measurements from one or more temperature sensors 152, bit error rate (BER) measurements from a read channel 156 of the device, and various power level and other parameters used by the system from a control circuit 158.

The BER measurements may be viewed as a number of correctable errors detected in readback data read from the various media surfaces 112 during normal data read/write operations. Other parameters and values can be used as desired, so the various values depicted in FIG. 6 are merely for purposes of illustration and are not necessarily limiting.

It is contemplated that the reliability monitoring circuit 152 may form a portion of a SMART (system monitoring and reliability testing) capabilities of the device 100 designed more generally to monitor the health and performance of the device and provide indications, as required, of potentially imminent failure of the device. In other cases, the circuit 152 may form a portion of a more complex or dedicated circuit designed to adaptively adjust system parameters to maintain and extend both reliability and performance of the device.

As explained in greater detail below, the reliability monitoring circuit monitors these and other parameters with a view toward detecting a trend that indicates a potentially imminent failure of one or more components of a given transducer 110. Once such an exception condition is detected, the circuit 152 may elect to signal a scheduler circuit 160 to schedule and perform a cycle test, explained below, to collect data relating to the affected transducer 110. The results of the cycle test are forwarded by the scheduler circuit 160 to a parametric adjustment circuit 162 which selects and implements a new set of power level values for the transducer.

The operation of the reliability monitoring circuit 150 is cyclical and adaptive in that various changes to existing parameters are implemented in real time based on real world performance. In some cases, multiple passes through the circuit 150 may be necessary before a particular exception condition is cleared. It is noted that the adjustments are carried out without the need for the device to wait for an idle period of time during which few or no pending host access commands are being supplied to the device 100; rather, the circuit 100 operates in real time to adaptively adjust system performance values by relying upon real world BER and other measurements based on real user data transfers without substantially affecting the overall data I/O transfer rate performance of the device.

Figure 7:
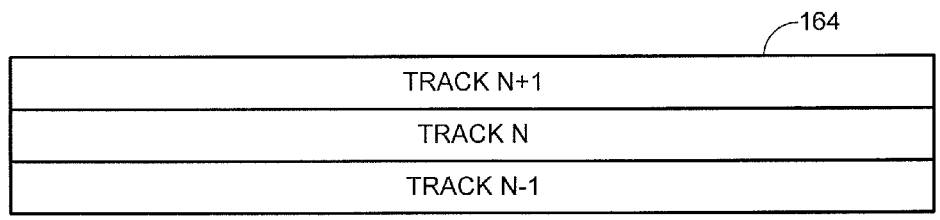
FIG. 7 shows a set of tracks utilized by the control circuitry of FIG. 6.

FIG. 7 illustrates three (3) data tracks 164 that may be used by the circuit 150 in some embodiments. It is contemplated that the data tracks 164 are nominally identical to the exemplary data track 142 discussed above in FIGS. 4-5, and may be located at a suitable location on the associated media recording surface 112. In some cases, sets of tracks may be provided at different radial locations across the radial extent of the associated recording surface 112. For example, for devices 100 that utilize zone based recording (ZBR) techniques where groups of tracks are arranged into concentric zones all written at a given data recording frequency, a set of tracks such as 164 in FIG. 7 may be provisioned for each zone.

Three tracks are shown in FIG. 7; a center track N, an immediately adjacent track N+1 disposed in a direction toward the innermost diameter (ID) of the rotating disc recording surface 112, and an immediately adjacent track N−1 disposed in a direction toward the outermost diameter (OD) of the recording surface. Other arrangements can be used, but it is contemplated (although not necessarily required) that three tracks will be used that are immediately adjacent one another without any other intervening tracks therebetween.

Figure 8:
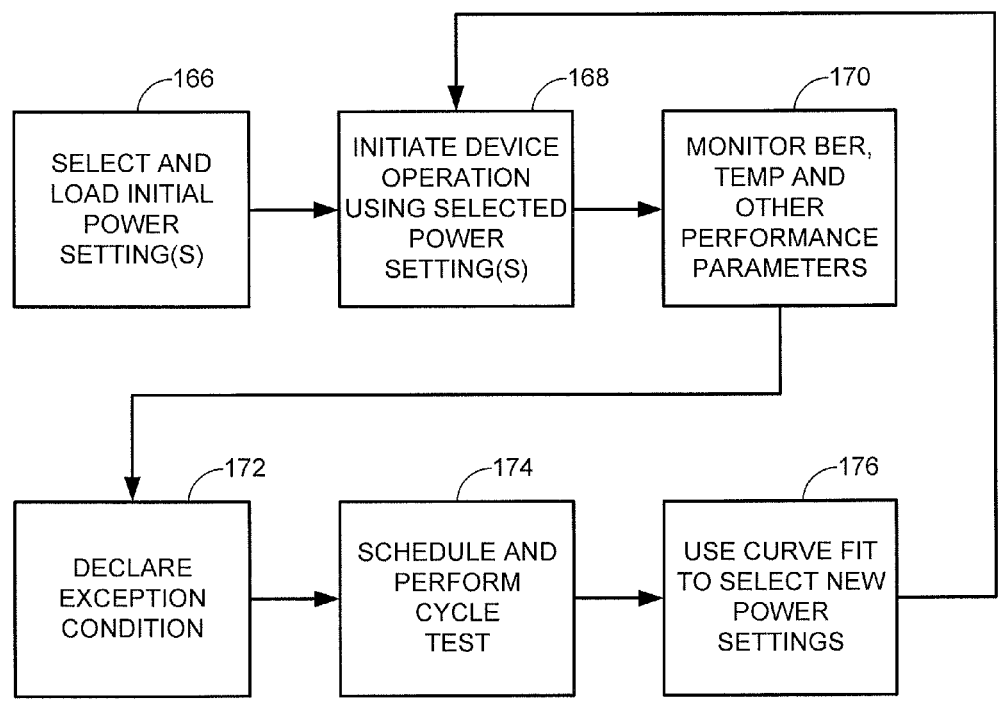
FIG. 8 is a processing block diagram showing various steps carried out by the control circuitry of FIG. 6.

FIG. 8 shows a generalized process flow of steps that may be carried out by the device 100 during normal operation to utilize the reliability monitoring circuit 150 of FIG. 6 and the specially configured tracks 164 of FIG. 7. At block 166, initial power settings are selected and loaded for use by a given transducer 110. These may include suitable write voltage and/or current magnitudes for use by the write driver circuit 132 (see FIG. 3), suitable laser power diode current and/or voltage magnitudes for use by the laser driver circuit 136, and suitable heater power current and/or voltage magnitudes for use by the heater driver circuit 138.

While not limiting, it is contemplated that the inputs to these respective driver circuits 132, 136 and 138 are digital values over a selected range and the associated driver circuits convert these to appropriate analog values that are supplied to the associated transducer elements 118, 122 and 124 (see FIG. 3).

At this point it will be noted that the current explanatory discussion will contemplate that all three of these power setting values are utilized in the reliability monitoring and analysis operation. In other embodiments, less than all of these values, including a single value (e.g., laser power) or only a subset of the values (e.g., laser power and heater power) is evaluated and used.

At block 168 normal device operation is initiated so that the device 100 operates to execute various data access (e.g., read and write) operations initiated by a host device. Write operations involve the writing of data to various data tracks, and read operations involve the subsequent reading back of previously written data to return the data to the host. The various access operations are carried out using the initially established power settings.

Block 170 shows a monitoring function that is carried out in the background during such access operations. Various parameters may be measured including temperature and BER. Other parameters may be measured as well as required. In some cases, such monitoring involves statistical analyses such that a baseline historical performance level is observed and exception conditions are declared only when statistically significant variations are detected. In other cases, predetermined threshold levels may be established for various parameters and exception conditions are declared when a given measured parameter (e.g., BER, temperature, etc.) exceeds such predetermined thresholds.

Regardless, at such time during ongoing operation the parametric data indicate that a potentially imminent failure condition or other change has been detected, an exception condition will be declared at step 172. This results in the reliability and monitoring circuit 152 scheduling and performing a cycle test via the scheduler circuit 154 (see FIG. 6). The cycle test involves writing data to and reading data from the specially configured evaluation tracks 164 of FIG. 7, as shown at block 174. The results of this cycle test are processed at block 176 using curve fit and other mathematical techniques to select a new set of power settings, which are then implemented by the system. The system operation resumes at block 166 with the new power settings, and the system continues to monitor and, as necessary, make further adaptive adjustments to the power settings of the associated transducer.

Figure 9:
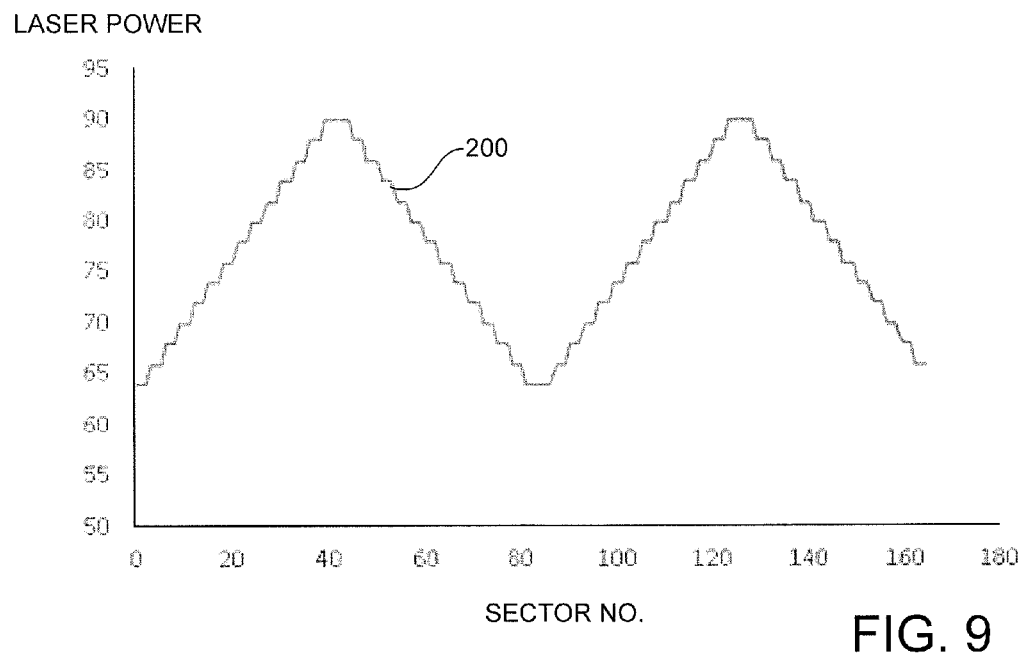
FIG. 9 is a graphical representation of stepped power levels applied during a cycle test of FIG. 8.

FIG. 9 is a graphical representation of a laser power curve 200 indicative of exemplary laser power values that may be applied to a selected track during the cycle testing of block 174. The curve 200 is plotted against a sector number x-axis and a laser power y-axis. The various values are merely exemplary and other values can be used.

From FIG. 9 it can be seen that, as a part of the cycle test, at least one track is read while different laser power values are applied to the laser diode 122, which step from a minimum value to a maximum value and back down again. This provides a number of different laser power (and associated heating values) from which individual BER values can be obtained, as generally shown in FIG. 10.

Figure 10:
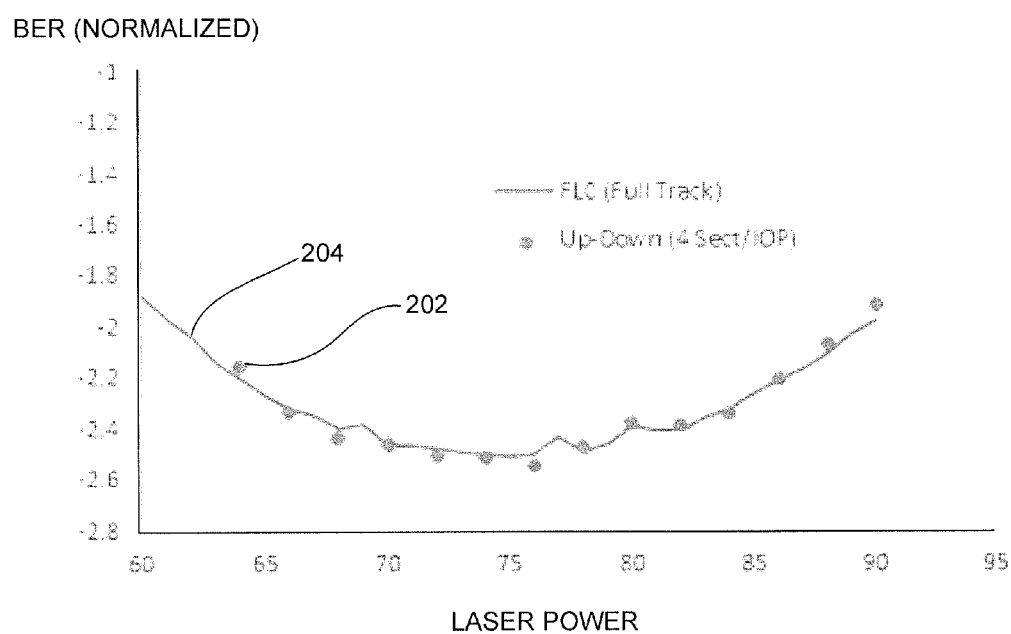
FIG. 10 is a graphical representation of a curve fit operation using data obtained during the cycle test.

More particularly, FIG. 10 illustrates a number of dots 202 that correspond to the calculated BER values for each of the individual magnitude step values from curve 200 in FIG. 9. Curve 204 is a mathematical curve fit approximation of the various dots 202 using suitable curve fitting techniques known in the art. Both the dots 202 and the resulting curve fit approximation 204 are plotted against a laser power x-axis and a normalized BER y-axis. It will be appreciated that while FIGS. 9 and 10 are shown using laser diode power input values, other power values such as heater power and write element power can be used as well.

In some embodiments, the lower the BER the better, since the ratio is the number of erroneous bits per total group of bits. Accordingly, a minimum value of the laser power from the curve 204 can be selected from FIG. 10 and implemented. Interpolation techniques can be used to select this laser power value, and this is the laser power value for that transducer that is implemented at block 176 in FIG. 8. In this way, the cycle test can be quickly performed, a new suitable lower power value can be selected and implemented, and system operation can be resumed to see if an improvement is made to system performance.

It is contemplated, for example, that the exception condition is declared because BER has become excessively high or a higher than normal temperature is detected. In such case, a lower power value that still provides suitable BER performance can be selected from the curve 204. Hence, in some embodiments the range of available new power levels can be restricted to those that are lower than the existing power level. In this way, the system can potentially operate to select a lower power setting that (at least hopefully) will reduce the temperature of the transducer while still providing sufficiently adequate BER performance.

Figure 11:
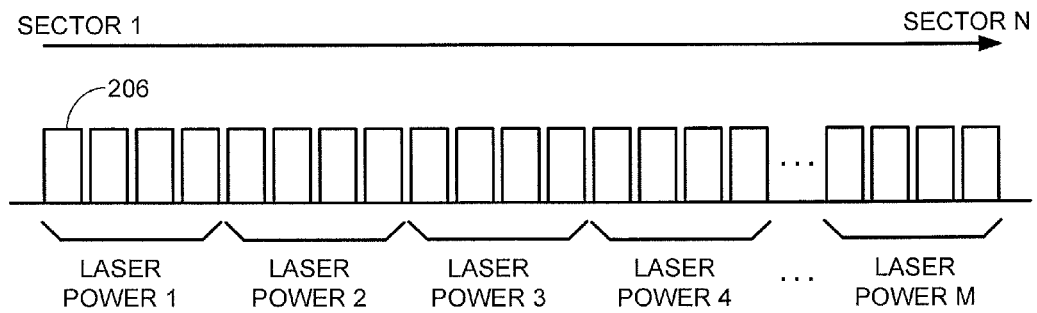
FIG. 11 illustrates application of different power levels to groups of data sectors during the cycle testing.

FIG. 11 is a schematic representation of one of the test tracks 164 from FIG. 7 utilized during the cycle test. The test track 164 includes a total number N data sectors 206, numbered from Sector 1 to Sector N. Sector 1 may be identified as that sector that immediately follows a predefined index point (e.g., a once-around reference corresponding to a 0 degree angular position).

A number of laser power settings M (or other power settings, such as heater settings) is selected where M is less than N and is divisible into N. In this way, a total number of sectors equal to the ratio of N/M can be subjected to each individual power setting in turn. For example, if the track 164 has a total of 200 data sectors (e.g., N=200), and a total of 25 different stepped power settings are selected for evaluation (e.g., M=25), then a total of eight (8) sectors (N/M=200/25=8) will be subjected to each power setting, and a separate BER value can be calculated for each set of 8 sectors. These average BER values correspond to the dots 204 in FIG. 10.

Figure 12:
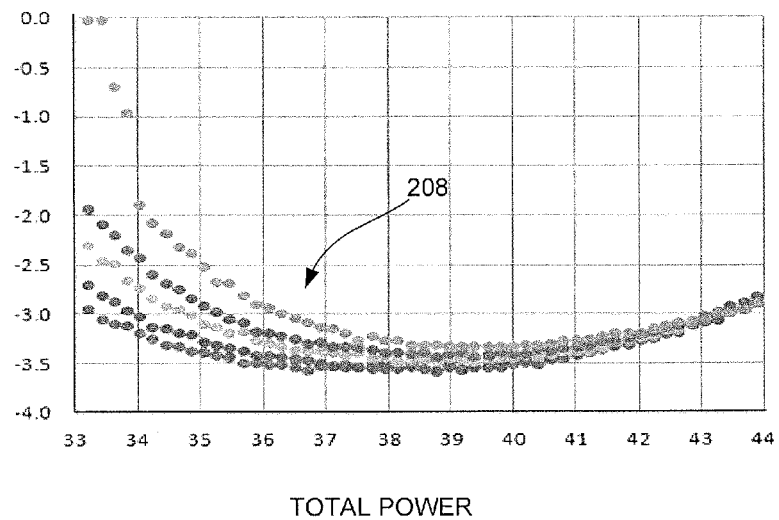
FIG. 12 is a graphical representation of multiple curves generated using data obtained during the cycle test.

In some cases, multi-variable power settings can be evaluated through multiple passes. FIG. 12 shows a sequence of power curve values 208 that represent BER values obtained for different laser diode power settings and heater values. Each individual curve represents laser power settings, and the different curves are provided for different clearance distances (corresponding to different heater values). The curves are plotted against a total power x-axis and a normalized BER y-axis.

In this way, a suitable set of power values (e.g., minimum laser and heater values) that produce acceptable BER with lowest heat dissipation can be selected and implemented. From this it can be seen that multiple passes of the flow of FIG. 6 can be used to obtain history data based on current conditions, enabling the system to lower power dissipation while maintaining suitable levels of system performance.

Figure 13:
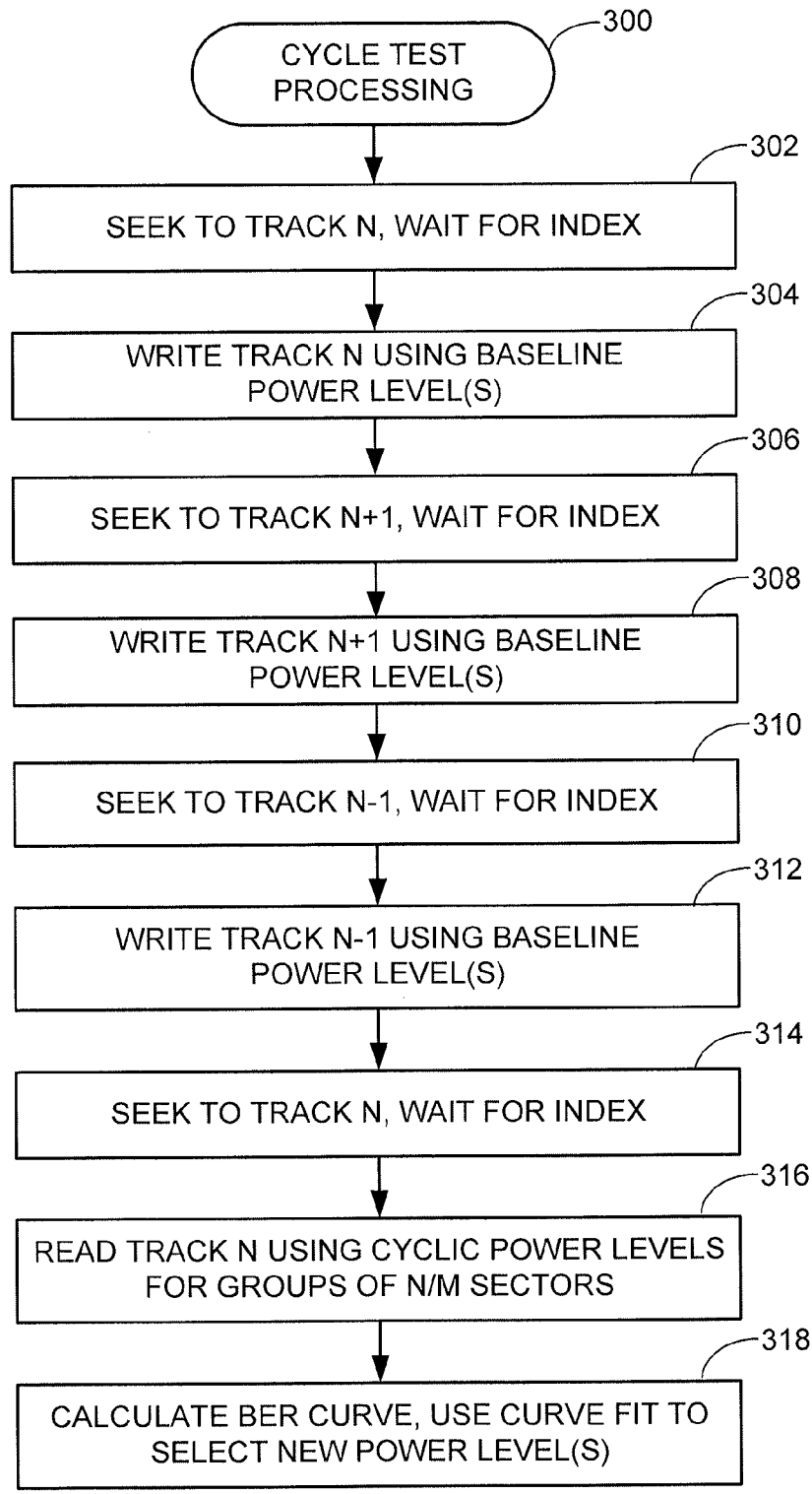
FIG. 13 is a flow chart for a cycle test processing routine illustrative of steps carried out in accordance with some embodiments.

FIG. 13 is a flow chart for a cycle test processing routine 300 illustrative of steps carried out during the cycle test operations discussed above. The routine may be viewed as representing programming stored in a memory location and utilized by a programmable processor of the reliability monitoring circuit 152 to carry out or otherwise direct the various operations set forth by the routine. The routine is merely exemplary so that the various steps can be modified, omitted, performed in a different order or augmented with additional steps as required.

It is contemplated that each pass through the routine will only require a minimal amount of time, such as on the order of 50 milliseconds, ms or less, so that the cycle test can be treated as a pending command and scheduled in conjunction with existing host access commands. In some cases, the routine may be executed in a maximum of about 35 ms or less, depending on various factors including rotational speed of the media and the proximity and number of available evaluation track sets (see FIG. 7). Hence, it will be understood that the cycle test is performed during ongoing host access operations and does not require the system to wait for an idle time or otherwise significantly affect ongoing host I/O transfer rate performance.

Finally it will be appreciated that the routine 300 of FIG. 13 is enacted at such times that an exception condition is detected by the reliability monitoring circuit 152 (FIG. 6). This may be carried out on a transducer-by-transducer basis, as well as on a zone-by-zone basis. Multiple passes through the routine may be necessary before final adaptively obtained power values are generated and implemented. Basically, the system will continue to enact the routine until such time that the circuit 152 no longer detects exception conditions or no further adjustments are made to the various power settings, indicating that optimal values have been obtained.

The routine 300 commences at step 302 where a seek is commanded to move the associated transducer 110 to track N of the set of evaluation tracks 164 (FIG. 7). As noted above, a single set of evaluation tracks may be defined for each media surface 112, or multiple sets of such tracks may be arranged across the disc surface, such as one set for each zone or set of zones.

Once the index reference point is detected, data are written at step 304 to the various sectors on the associated track N using a baseline set of power levels. This may include the existing various power levels used by the transducer (e.g., the existing write current magnitude, power diode current and heater current values, etc.). Other baseline values can be used as desired. The data pattern can take any suitable form, including an oscillating pattern (e.g., a 2T pattern), random data, etc.

As shown by step 306, once the data have been written to track N, the system commands a seek to the next adjacent track N+1. The routine shows that the system waits for the next occurrence of the index reference position, but such is not necessarily required; the writing of data to track N+1 can commence as required to write corresponding patterns to the sectors on track N+1, step 308.

Step 310 next shows a two track seek to track N−1, followed by the writing of a suitable data pattern to track N−1 at step 312. The writing of a fresh data set to all three tracks N−1, N and N+1 is not necessarily required in all embodiments, but can be useful since the "fresh" writing of data will take into account the existing health or state of the transducer, including the current state of the laser diode and write element, as well as the efficacy of such with the current heater value. Thus, while previously written tracks can be evaluated, it is contemplated that the system will provide a more robust solution if the elements operate under the existing conditions (which includes the existing temperature of the system).

Step 314 next shows a one track seek of the transducer back to the center track N, along with a waiting of the system for the occurrence of the once-around index reference point. The system proceeds to read, at step 316, the data written to track N while cyclically effecting the power level values discussed above in FIGS. 9-11.

For example, with reference again to FIG. 9, the laser power diode is subjected to the stepped values shown by curve 200 as the read element endeavors to read back the data written to the various sectors. While the laser diode normally should have no impact on the existing magnetization of the media since no new magnetic field is being applied to change the magnetization thereof, changes in the laser power may affect the temperature of the transducer, and hence the SNR (signal to noise ratio) of the read sensor response.

Step 318 shows that, once the readback data have been obtained from step 316, a curve fit BER curve is calculated as shown in FIG. 10 and one or more new suitable power levels are selected for implementation.

It will now be appreciated that the various embodiments presented herein can provide a number of benefits. By providing a mechanism that detects exception conditions based on past history (and deviations from existing historical baseline levels), a quick cycle test can be scheduled during normal data access operations to gather data for different power levels to select a new suitable power value that is lower than the existing value but yet still provides acceptable BER and other performance.

The test is configured such that it is not necessary for the system to enter an offline condition to go perform an extensive calibration test in order to derive a new power value; all that is needed is a short evaluation sufficient to statistically select a new, better power value for at least one operative element of the transducer followed by continued evaluation of how the system operates with real world user data to judge the effectiveness of the new value. Successive iterations can be used in an adaptive fashion to arrive at a final set of power settings that maximize performance and reliability without affecting ongoing data transfer rate performance.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
applying an initial power value to a powered element of a transducer to write user data from a host device to a rotatable data recording medium;
declaring an exception condition responsive to a measured parameter associated with the transducer;
using the transducer to read data from an evaluation track on the rotatable data recording medium using a range of different input power values for the powered element;
selecting a different, new power value for the powered element responsive to an error rate associated with each of the range of different input power values, the new power value lower than the initial power value; and
applying the new power value to the powered element during a subsequent writing of user data to the rotatable data recording medium.

2. The method of claim 1, wherein the powered element is a laser diode of a heat assisted magnetic recording (HAMR) system and the initial and new power values are input values to a driver circuit which applies voltage and/or current to the laser diode having a magnitude selected responsive to a magnitude of the initial and new power values, respectively.

3. The method of claim 1, wherein the powered element is a heater element of a fly height adjustment (FHA) system and the initial and new power values are input values to a driver circuit which applies voltage and/or current to the heater element having a magnitude selected responsive to a magnitude of the initial and new power values, respectively.

4. The method of claim 1, wherein the powered element is a write element configured to apply a bi-directional magnetic field to a recording layer of the medium to write data thereto and initial and new power values are input values to a driver circuit which applies voltage and/or current to the write element having a magnitude selected responsive to a magnitude of the initial and new power values, respectively.

5. The method of claim 1, wherein the exception condition is detected responsive to a temperature measurement from a temperature sensor.

6. The method of claim 1, wherein the exception condition is detected responsive to a bit error rate (BER) measurement from a read channel connected to the transducer.

7. The method of claim 1, further comprising using the transducer to write data to first, second and third immediately adjacent tracks on the medium with the second track between the first and third tracks using a baseline power value applied to the powered element of the transducer and the evaluation track is the second track.

8. The medium of claim 1, wherein the evaluation track comprises a total number of N data sectors and the range of different input power values comprises a total number of M different power values applied to the powered element so each different group of N/M sectors on the evaluation track is read using a different one of the power values within the range of M different power values, and a separate bit error rate (BER) is calculated for each of the different groups of N/M sectors on the evaluation track.

9. The medium of claim 8, wherein a curve fit approximation is calculated using the individual BER values for each different group of N/M sectors, and the new power value is selected using the curve fit approximation.

10. The medium of claim 1, wherein the magnetic recording medium is a perpendicular magnetic recording medium, the transducer comprises a perpendicular write coil and a magneto-resistive (MR) sensor, the powered element is a laser diode of a heat assisted magnetic recording (HAMR) system, and the exception condition is declared responsive to a temperature associated with the transducer exceeding a predetermined temperature threshold.

11. A data storage device, comprising:
a data transducer adjacent a rotatable data recording medium;
a transducer control circuit configured to apply an initial power value to a powered element of the transducer to write user data from a host device to the rotatable data recording medium;
a reliability monitoring circuit configured to declare an exception condition responsive to a measured parameter associated with the transducer;
a scheduler circuit configured to direct the transducer to read data from an evaluation track on the rotatable data recording medium using a range of different input power values for the powered element; and
a parametric adjustment circuit configured to select a different, new power value for the powered element responsive to an error rate associated with each of the range of different input power values, the new power value lower than the initial power value, the transducer control circuit applying the new power value to the powered element during a subsequent writing of user data to the rotatable data recording medium.

12. The data storage device of claim 11, wherein the powered element is a laser diode of a heat assisted magnetic recording (HAMR) system and the initial and new power values are input values to a driver circuit which applies voltage and/or current to the laser diode having a magnitude selected responsive to a magnitude of the initial and new power values, respectively.

13. The data storage device of claim 11, wherein the powered element is a heater element of a fly height adjustment (FHA) system and the initial and new power values are input values to a driver circuit which applies voltage and/or current to the heater element having a magnitude selected responsive to a magnitude of the initial and new power values, respectively.

14. The data storage device of claim 11, wherein the powered element is a write element configured to apply a bi-directional magnetic field to a recording layer of the medium to write data thereto and initial and new power values are input values to a driver circuit which applies voltage and/or current to the write element having a magnitude selected responsive to a magnitude of the initial and new power values, respectively.

15. The data storage device of claim 11, further comprising a temperature sensor, wherein the exception condition is detected responsive to a temperature measurement from the temperature sensor.

16. The data storage device of claim 11, further comprising a read channel connected to the transducer, wherein the exception condition is detected responsive to a bit error rate (BER) measurement from the read channel.

17. The data storage device of claim 11, further comprising using the transducer to write data to first, second and third immediately adjacent tracks on the medium with the second track between the first and third tracks using a baseline power value applied to the powered element of the transducer and the evaluation track is the second track.

18. The data storage device of claim 11, wherein the evaluation track comprises a total number of N data sectors and the range of different input power values comprises a total number of M different power values applied to the powered element so each different group of N/M sectors on the evaluation track is read using a different one of the power values within the range of M different power values, and a separate bit error rate (BER) is calculated for each of the different groups of N/M sectors on the evaluation track, and wherein the adjustment circuit performs a curve fit approximation using the individual BER values for each different group of N/M sectors and selects the new power value using the curve fit approximation by identifying the new power value as providing at least a minimum acceptable BER value at a lower power value than the initial power value.

19. The data storage device of claim 11, wherein the reliability monitoring circuit, the scheduler circuit and the parametric adjustment circuit are characterized as a programmable processor having associated programming steps stored in a memory location executable by the programmable processor.

20. The data storage device of claim 11, wherein the magnetic recording medium is a perpendicular magnetic recording medium, the transducer comprises a perpendicular write coil and a magneto-resistive (MR) sensor, the powered element is a laser diode of a heat assisted magnetic recording (HAMR) system, and the exception condition is declared responsive to a temperature associated with the transducer exceeding a predetermined temperature threshold.

* * * * *